US006970278B1

(12) United States Patent
Buican

(10) Patent No.: US 6,970,278 B1
(45) Date of Patent: Nov. 29, 2005

(54) CONTROLLING RESONANT PHOTOELASTIC MODULATORS

(75) Inventor: Tudor N. Buican, Albuquerque, NM (US)

(73) Assignee: Hinds Instruments, Inc., Hillsboro, OR (US)

( * ) Notice: Subject to any disclaimer, the term of this patent is extended or adjusted under 35 U.S.C. 154(b) by 0 days.

(21) Appl. No.: 09/623,954

(22) PCT Filed: Mar. 16, 1999

(86) PCT No.: PCT/US99/05586

§ 371 (c)(1),
(2), (4) Date: Sep. 10, 2001

(87) PCT Pub. No.: WO99/47966

PCT Pub. Date: Sep. 23, 1999

Related U.S. Application Data

(60) Provisional application No. 60/078,069, filed on Mar. 16, 1998.

(51) Int. Cl.[7] ............................. G02F 1/33; G02B 9/02
(52) U.S. Cl. ..................................... 359/240; 359/246
(58) Field of Search ............................ 359/240, 245, 359/246, 254, 285, 290, 305, 315, 322, 349, 359/351; 356/368

(56) References Cited

U.S. PATENT DOCUMENTS 4,865,450 A * 9/1989 Munechika et al. ......... 356/489
5,298,973 A * 3/1994 Fukazawa et al. .......... 356/368

* cited by examiner

Primary Examiner—Scott J. Sugarman
(74) Attorney, Agent, or Firm—ipsolon LLP

(57) ABSTRACT

A system and method for exploiting the dependance of a photoelastic modulator's (PEM's) resonance frequency on temperature (attributable to driving amplitude and to ambient temperature) to generally improve the performance of PEMs. In one embodiment there is provided a method and system for efficiently driving a series of multiple PEMs. To this end, each of the PEMs in a stack are separately tuned, as by controlling the power dissipated in each PEM, so that the resonance frequencies of all of the PEMs converge to a common frequency. Thus, all of the PEMs are simultaneously at resonance to ensure maximum efficiency and to maintain a selected total retardation amplitude. In another embodiment of the present invention, a single-element PEM is controlled in a manner to account for the subtle changes in the PEM's resonance frequency. To this end a control method and system is provided to keep constant both the retardation amplitude of the PEM and the actual operating frequency of the PEM, which frequency need not necessarily be the resonant frequency.

14 Claims, 4 Drawing Sheets

CONTROLLING RESONANT PHOTOELASTIC MODULATORS

This application is a national stage of PCT/US99/05586, filed Mar. 16, 1999, which claims the benefit under 35 USC 119(c) of US Provisional Application 60/078,069, filed Mar. 16, 1998.

TECHNICAL FIELD

This application relates to a system and method for precise control of resonant photoelastic modulators.

BACKGROUND

A resonant photoelastic modulator (PEM) is an instrument that is used for modulating the polarization of a beam of light. A PEM employs the photoelastic effect as a principle of operation. The term "photoelastic effect" means that an optical element that is mechanically strained (deformed) exhibits birefringence that is proportional to the amount of strain induced into the element. Birefringence means that the refractive index of the element is different for different components of polarized light.

A PEM includes an optical element, such as fused silica, that has attached to it a piezoelectric transducer for vibrating the optical element at a fixed frequency, within, for example, the low-frequency, ultrasound range of about 20 kHz to 100 kHz. The mass of the element is compressed and extended as a result of the vibration.

The compression and extension of the optical element imparts oscillating birefringence characteristics to the optical element. The frequency of this oscillating birefringence is the resonant frequency of the optical element and is dependent on the size of the optical element, and on the velocity of the transducer-generated longitudinal vibration or acoustic wave through the optical element.

Retardation or retardance represents the integrated effect of birefringence acting along the path of electromagnetic radiation (a light beam) traversing the vibrating optical element. If the incident light beam is linearly polarized, two orthogonal components of the polarized light will exit the optical element with a phase difference, called the retardance. For a PEM, the retardation is a sinusoidal function of time. The amplitude of this phase difference is usually characterized as the retardance amplitude or retardation amplitude of the PEM.

In conventional PEMs, the value of the retardation amplitude is selectable by the user. Because resonant PEMs are typically driven at their resonant frequency, stress oscillations, which are induced by the transducer, can exhibit relatively large amplitudes. However, driving PEMs at their resonant frequency prevents the user from controlling the oscillation frequency.

Both the size and acoustic wave velocity of a PEM depend on the optical element's temperature. Consequently, the resonant frequency of a PEM will also depend on the device's temperature. In general, this temperature depends on two factors: (1) the ambient temperature, and (2) the amplitude of the stress oscillations in the optical element. At high stress amplitudes, the amount of acoustic (mechanical) energy absorbed in the optical element can become significant. As the absorbed acoustic energy is converted to heat within the mass of the element, significant temperature increases and corresponding shifts in the PEM's resonant frequency can occur.

PEMs having high retardance amplitudes are required, for example, in Fourier Transform spectral analysis (see, for instance, U.S. Pat. Nos. 4,905,169 and 5,208,651). In such applications, spectral resolution is proportional to the PEM's retardation amplitude, and useful spectral resolutions are achieved at high amplitudes, which cannot be reached by a conventional (single) PEM.

The most direct way of achieving these high-retardation amplitudes is to stack together several PEMs. In such an arrangement it is important that the sum or total of the retardation amplitudes of all of the PEMs matches the sum of the maximum retardation amplitudes of each of the PEMs in the stack.

Even if all the PEMs in a stack are driven at the same frequency, the total retardation amplitude of the stack may be less than the sum of the maximum retardation amplitudes of each of the PEMs in the stack. This is because even a relatively small spread in the resonant frequencies of the individual PEMs, which is fully consistent with manufacturing specifications, results in most of the PEMs not being driven exactly at resonance. As a result, the phases of the oscillations of the individual PEMs are not the same, even though the PEMs are driven at the same frequency, and, therefore, the total retardation amplitude is less than the sum of the individual amplitudes.

Furthermore, uneven heating of the individual PEMs when driven at high amplitudes may result in the individual resonant frequencies drifting by unequal amounts. Consequently, the phases of the individual PEM oscillations may further diverge as the driving amplitude is increased or as the system warms up. This may lead to a further decrease in the efficiency of the PEM stack.

The problem of drifting operating frequencies is not limited to stacked PEM arrangements. In a conventional single PEM system, even though the retardation amplitude can be adjusted at will (within the limits set by the maximum driving voltage provided by the electronic circuits), the system's operating frequency is determined by the PEM's resonant frequency and, as explained above, thus depends on both ambient temperature and the amplitude at which the PEM is driven. This results in an operating frequency that drifts with ambient temperature, as well as during warm-up and after changes in the set retardation amplitude. Such a situation may be undesirable in certain applications where the PEM's operating frequency, as well as its amplitude, must be kept constant.

SUMMARY OF THE INVENTION

The present invention is directed to a practical system and method for exploiting the dependence of a PEM's resonance frequency on temperature (attributable to driving amplitude and to ambient temperature) to generally improve the performance of PEMs.

In one embodiment of the present invention, there is provided a method and system for efficiently driving a series of multiple PEMs (such as the stacked arrangement noted above). To this end, each of the PEMs in the stack are separately tuned, as by controlling the power dissipated in each PEM, so that the resonant frequencies of all of the PEMs converge to a common frequency. Thus, all of the PEMs are simultaneously at resonance to ensure maximum efficiency and to maintain a selected total retardation amplitude. Thus controlled, the common-resonance-frequency PEMs operate like a single PEM, but at a much higher retardation amplitude than that available from conventional single-element PEMs. This result makes the multiple PEM arrangement amenable to applications, such as the above-mentioned Fourier Transform spectral analysis, that require large retardation amplitudes.

In another embodiment of the present invention, a single-element PEM is controlled in a manner to account for the subtle changes in the PEM's resonant frequency. To this end, a control method and system is provided to keep constant both the retardation amplitude of the PEM and the actual operating frequency of the PEM, which frequency need not necessarily be the resonant frequency.

Other advantages and features of the present invention will become clear upon study of the following portion of this specification and drawings.

BEST MODES FOR CARRYING OUT THE INVENTION

Figure 1:
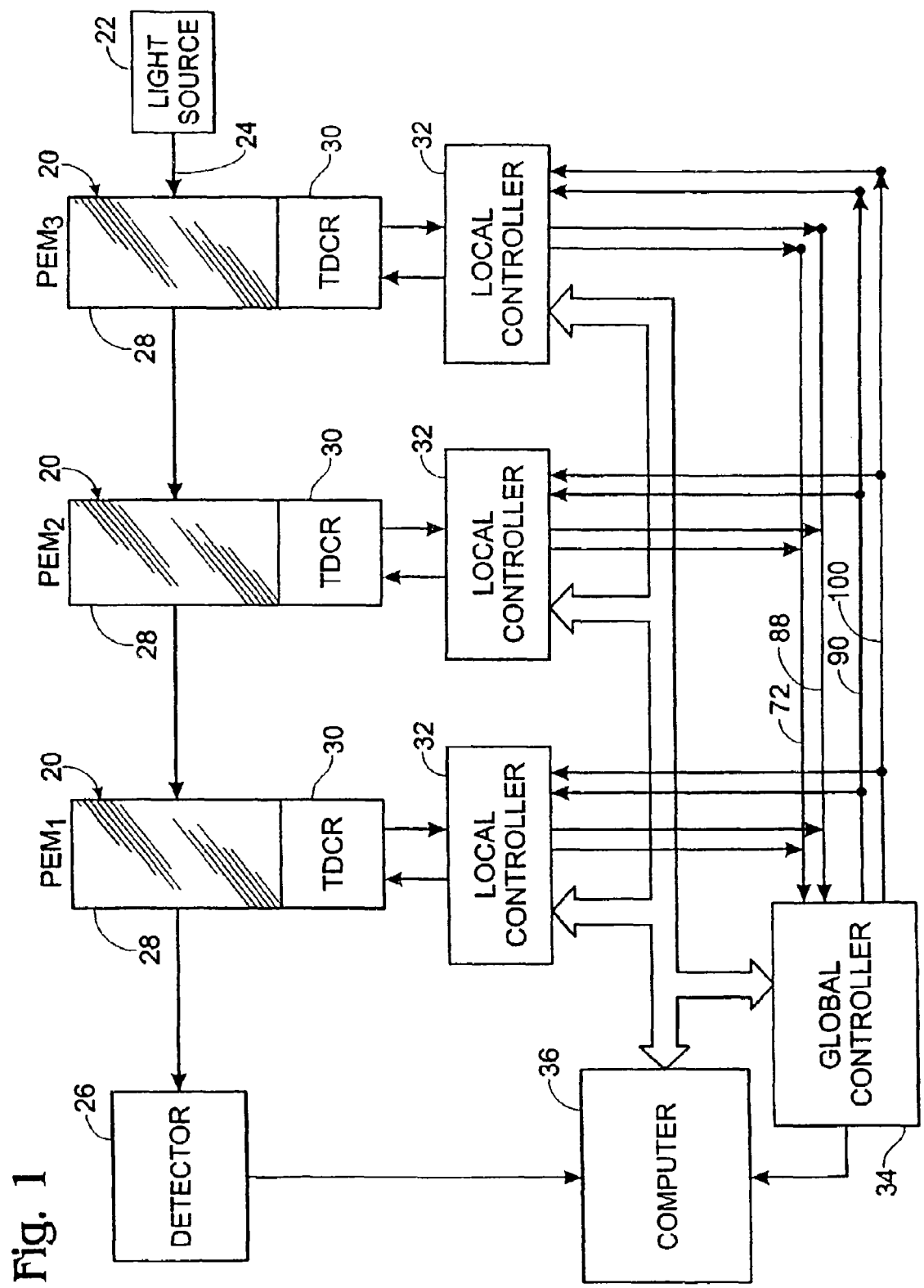
FIG. 1 is a diagram of an exemplary system for controlling multiple PEMs in accordance with one aspect of the present invention.

The diagram of FIG. 1 depicts an exemplary system for controlling multiple photoelastic modulators (PEMs) in accordance with one aspect of the present invention. In this embodiment, a series of three PEMs 20 are depicted. The PEMs are aligned so that light from a source 22 travels in a beam 24 through each of the PEMs 20 to reach a detector 26. The optical aspects of the setup shown in FIG. 1 have been greatly simplified (polarizers, etc. being omitted) for the purposes of this description. Such a setup may be used, for example, in the Fourier Transform spectral analysis mentioned above.

The polarization of the light 24 is modulated by the PEMs to impart a retardation amplitude in the beam that reaches the detector. In this regard, the optical element 28 of each PEM is vibrated by an attached piezoelectric transducer 30, thereby to introduce into the optical element (such as fused silica) the oscillating birefringence discussed above (as well as the attendant contribution to the total retardation in the light that reaches the detector).

In accord with one embodiment of the present invention there is provided a system for controlling the multiple PEM arrangement just described so that all of the PEMs operate at a resonant frequency and provide a total retardation amplitude (i.e., the sum of the individual values of the retardation provided by each PEM) that precisely matches a desired reference amplitude.

The preferred system is primarily embodied as local controllers 32, one of which is associated with each PEM 20, and a global (system) controller 34. As will be explained, a computer 36 is, optionally, provided to facilitate operation of the global and local controllers, which computer 36 may also receive the total retardation information collected by the detector 26.

Before discussing the particulars of the global and local controllers, it is worth pointing out that for a single PEM to be driven at resonance and with a selected retardation amplitude, one must, in general, control two parameters: (1) driving voltage and (2) driving frequency. There are also two independent error signals that can be used by a feedback loop in order to adjust these control parameters. These are (1) the retardation amplitude error and (2) the phase error between PEM driving voltage and current.

The phase error relates the driving frequency to the resonant frequency of the PEM. In the simplest situation, the phase error is zero when the two frequencies are equal; that is, when the PEM is driven at resonance. (In the general case, the current-voltage phase difference corresponding to resonance driving will have a non-zero, but fixed, value. In such a case, the phase error will be the difference between the current-voltage phase difference and that fixed value.)

The retardation amplitude error is the difference between actual and selected retardation amplitudes, and vanishes when the two amplitudes are equal. The retardation amplitude error can be optically determined, or approximated by the driving current amplitude error. In the following portion of this description, the latter approximation is employed, although the former is certainly usable.

A stable feedback loop can be implemented so that the two control parameters (driving voltage and driving frequency) always change in such a way as to cancel the two error signals. When the two error signals have vanished, the PEM operates at resonance and provides the selected retardation amplitude.

FIG. 1 depicts the use of multiple (stacked) PEMs. Three PEMs are shown, although the following description will apply to groups of two or more PEMs. Thus, one can consider the series of PEMs as comprising any of a number "n" PEMs, which number is selected to suit the retardation amplitude needs of a particular application.

When "n" PEMs are stacked, there are n+1 control parameters (the driving voltage amplitude for each of the "n" PEMs and the common driving frequency). It would appear that 2n independent error signals must be cancelled (the amplitude and phase errors for each of the "n" PEMs). This would require 2n control parameters, such as "n" individual driving voltage amplitudes and "n" individual driving frequencies. However, in accordance with the present invention, the control system requires only n+1 control parameters in the system. As a result, the PEM stack is controlled (i.e., all PEMs reaching a common resonant frequency while maintaining a selected total retardation amplitude) with only n+1 control parameters.

Figure 2:
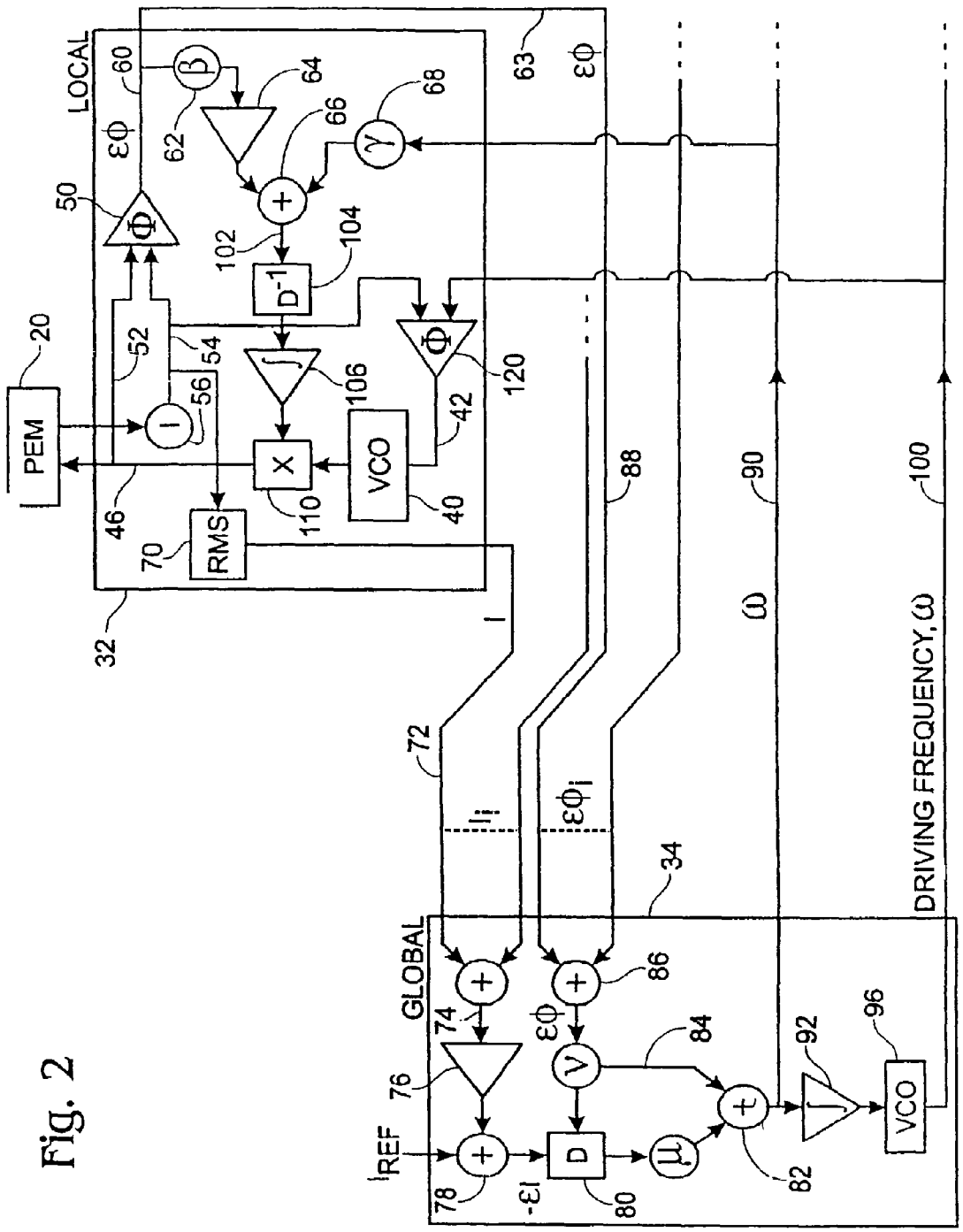
FIG. 2 is a block diagram of a global controller and one of the local controllers employed with a preferred embodiment of the present invention.

With reference to FIG. 2, each local controller 32 (only one of which is depicted in FIG. 2) monitors its PEM's current-voltage phase difference, as well as reference signals generated by the global controller 34, which reference signals are described more fully below. Using these signals, the local controller adjusts the voltage amplitude and frequency of the PEM's driving signal.

Furthermore, each local controller 32 generates a current-voltage phase error signal that is provided to the global controller 34. The local controller also sends a local current amplitude signal to the global controller 34. Also, each local controller 32 locks the phase of its PEM current to a common phase reference, preferably the phase of the common frequency signal generated by the global controller 34, as will be described.

With continued reference to FIG. 2, the exemplary one of "n" local controllers 32 drives its PEM by applying the following feedback equation 1:

$$V' = -D_\tau^{-1}(\beta\epsilon\phi - \gamma\omega')$$

the derivation of which is provided in U.S. Provisional Application No. 60/078,069, hereby incorporated by reference, and from which the present application claims the benefit of its filing date under 35 USC § 119e.

In the foregoing equation 1:

V'=the driving voltage amplitude to be applied by the local controller to its associated PEM; V' in equation 1 representing a time derivative of V;

$D_\tau^{-1}$=is an inverse integral operator (explained more below) for a PEM having a thermal time constant $\tau$ that is the quotient of the PEM's heat capacity and rate of heat exchange with ambient;

β=the temperature coefficient of the PEM at resonant frequency;

εφ=the phase difference between the PEM current and the drive signal voltage applied to the PEM;

γ=a coefficient determined by the individual physical characteristics of the PEM; and ω'=a value corresponding to the difference between a selected retardation amplitude (here approximated by a current amplitude) and the "average" retardation amplitude actually applied by the PEMs and to the sum of the phase error signals of all PEMs; this signal is the time derivative of the common driving frequency, and is supplied by the global controller.

With reference to FIG. 2, the local controller 32 employs a voltage-controlled oscillator (VCO) 40 receiving on line 42 a frequency input signal that, as described more below, sets the frequency of the constant amplitude signal that emanates from the VCO. That signal is applied to a multiplier 110 (shown as "X" in the figure and controlled as described below). The multiplier multiplies the amplitude of the VCO output signal. Thus, on line 46 there appears the drive voltage signal that is applied to drive the transducer of the PEM 20. In short, the VCO and multiplier elements can be considered as the PEM's drive waveform generator.

As noted above, the present system employs as one of two error signals the phase errors between each of the PEM drive voltage signals and the current applied to the PEM. To this end, each local controller 32 is provided with a phase comparator 50 that receives as input the drive voltage signal (via line 52) and a signal (line 54) that is proportional to the current applied to the PEM. This current signal is developed by a current pickup "I" shown at 56.

The output of the comparator 50 (line 60) comprises the phase error signal εΦ for that particular PEM. As noted above, if that error is different from zero (or, in general, from a predetermined nonzero value), then the PEM is not at resonance. As shown in FIG. 2, and with reference to equation 1, the error signal εΦ is multiplied by the temperature coefficient β (as by a multiplier 62), inverted by inverter 64 and directed to a summing circuit 66 as one of the input signals of that summing circuit. Also, the same signal εΦ is applied, via line 63, to the global controller 34 (as are the comparable signals from the other PEMs) for processing as described below.

The summing circuit 66 receives as its other input the signal ω'. This signal, which before reaching the summing circuit is multiplied by the γ coefficient at 68, is essentially representative of (1) the difference between the sum of all of the current amplitudes for the "n" PEMs and the current amplitude selected by the user to be reached by the overall system of "n" PEMs (keeping in mind that the present analysis uses the current amplitude as an approximation for the retardation amplitude) and (2) a measure of the combined phase errors εΦ$_i$ from all of the PEMs. The value of ω' is processed by the global controller (as described below) in accordance with the following feedback equation 2:

$$\omega' = -\mu D_\tau \epsilon I + \nu \epsilon \Phi$$

the derivation of which is provided in U.S. Provisional Application No. 60/078,069, and where:

μ=a coefficient determined by the physical characteristics of the PEMs in the system;

$D_\tau$=an integral operator, which functions as a low-pass filter;

ωI=the signal representing the current error; the difference between the sum of all of the current amplitudes for the "n" PEMs and the current amplitude selected by the user to be reached by the overall system of "n" PEMs; and ν=a coefficient determined by the physical characteristics of the PEMs in the system.

Before turning to a discussion of how the reference signals (ω' and a common driving frequency ω) are applied at the local controllers 32, this description will next discuss how those signals are generated by the global controller 34.

As to the current error ωI, each local controller 32 provides to the global controller 34 a signal indicative of the current amplitude that is applied to that particular PEM. This is done by directing the output of the above described current pickup 56 to a root-mean-square (rms) converter 70. This converter generates a voltage signal proportional to the square root of the mean signal value of the PEM current. This voltage signal, therefore, is a good measure of the PEM's current amplitude "I" and is provided on line 72 to the global controller (as are the comparable signals from the other PEMs over comparable lines).

The current amplitude signals $I_f$ from all of the PEMs are provided to a summing circuit 74 in the global controller, the output of which is inverted by an inverting amplifier 76 and applied to another summing circuit 78. That circuit has as its other input a reference signal $I_{ref}$ that represents the current amplitude selected by the user to be reached by the overall system of "n" PEMs (hence the total retardation amplitude). The output signal -ωI from this summing circuit 78 represents the difference between the system current amplitude $I_{ref}$ selected by the user and the sum of all the current amplitudes for the "n" PEMs.

Figure 3:
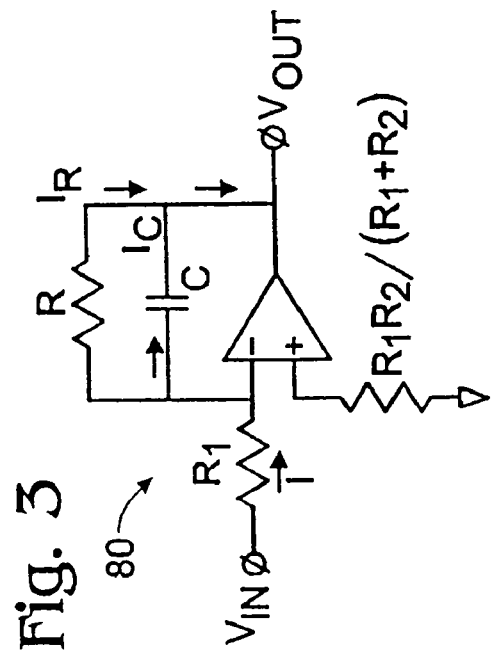
FIG. 3 is a diagram of a preferred embodiment of a low-pass filter employed as an operator in the global controller.

The signal representing ωI passes to an operator D, which can be embodied as a low-pass filter 80 (FIG. 3) for which the following relationship exists between output and input voltages:

$$V_{out} = R/R_1 \, D_\tau V_{in} \text{ where } \tau = RC.$$

The output of the low-pass filter 80 is multiplied by the coefficient μ and thereafter provided as one of two input signals to another summing circuit 82. On another input (line 84) that summing circuit 82 receives the sum (via summing circuit 86) of all of the phase error signals εφ$_i$ on line 63 (and associated lines from other local controllers) from all of the "n" PEMs as multiplied by the coefficient ν.

The signal ω' is output from the summing circuit 82 and applied on line 90 to all of the local controllers. As noted, this signal is comprised (see equation 2, above) of two components, one corresponding to the difference between a selected retardation amplitude and the "average" retardation amplitude actually applied by the PEMs and another to the sum of the phase error signals of all PEMs. As will become clear, this signal is used as a control parameter of the driving voltages of the individual PEMs.

The output of the summing circuit 82 is also applied to an integrator 92 that provides its output to a voltage controlled oscillator 96 (VCO) carried by the global controller 34. The VCO 96 places on line 100, which is common to all PEMs, a single driving frequency ω.

Figure 4:
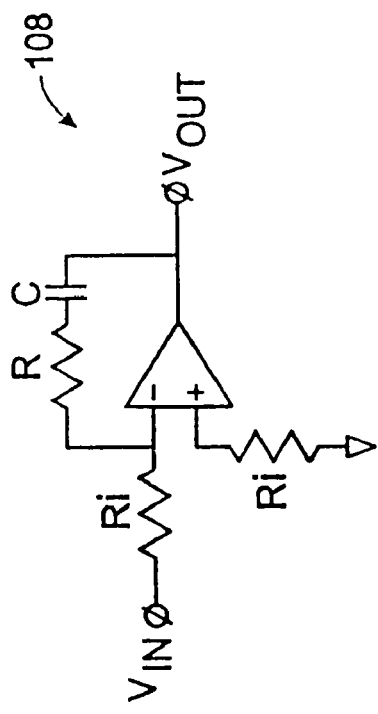
FIG. 4 is a diagram of a preferred embodiment of a low-pass filter employed as an operator in the local controllers.

Returning to the local controller 32, the γ-multiplied signal ω' summed at circuit 66 with the β-multiplied and inverted phase error signal εΦ for that particular PEM. The output (line 102) of that circuit is applied to a $D^{-1}$ operator 104 followed by an integrator 106. These components 104, 106 may be embodied as a low-pass filter 108 (see FIG. 4) where the voltage signal out is described as follows:

$$V_{out} = -1/R_i C \int D_\tau^{-1} V_{in}(t) dt, \text{ and with } \tau = RC.$$

This voltage output is an amplitude control signal applied, via multiplier 110, to modulate the constant amplitude output of the local controller VCO 40 so that the voltage amplitude applied to the PEM (via line 46) is that for matching the overall or "average" resonant frequency of all of the system PEMs. In short, the PEMs operate in unison (at the same resonant frequency), even though the individual retardation amplitudes are neither monitored nor directly controlled.

With all of the system PEMs operating in unison, the individual mechanical oscillation phases are locked to the phase of the common driving frequency signal co. This ensures that all PEMs oscillate in phase so that the total retardation amplitude is certain to equal the sum of the individual PEM amplitudes. In this regard, the local controllers 32 employ another phase comparator 120. That comparator compares the phases of the PEM current (as provided by the signal from the current pickup 56) with that of the common drive signal ω and outputs the difference (error) as the frequency input to the local controller's VCO 40, thereby locking the local PEM to the common, system drive frequency.

Figure 5:
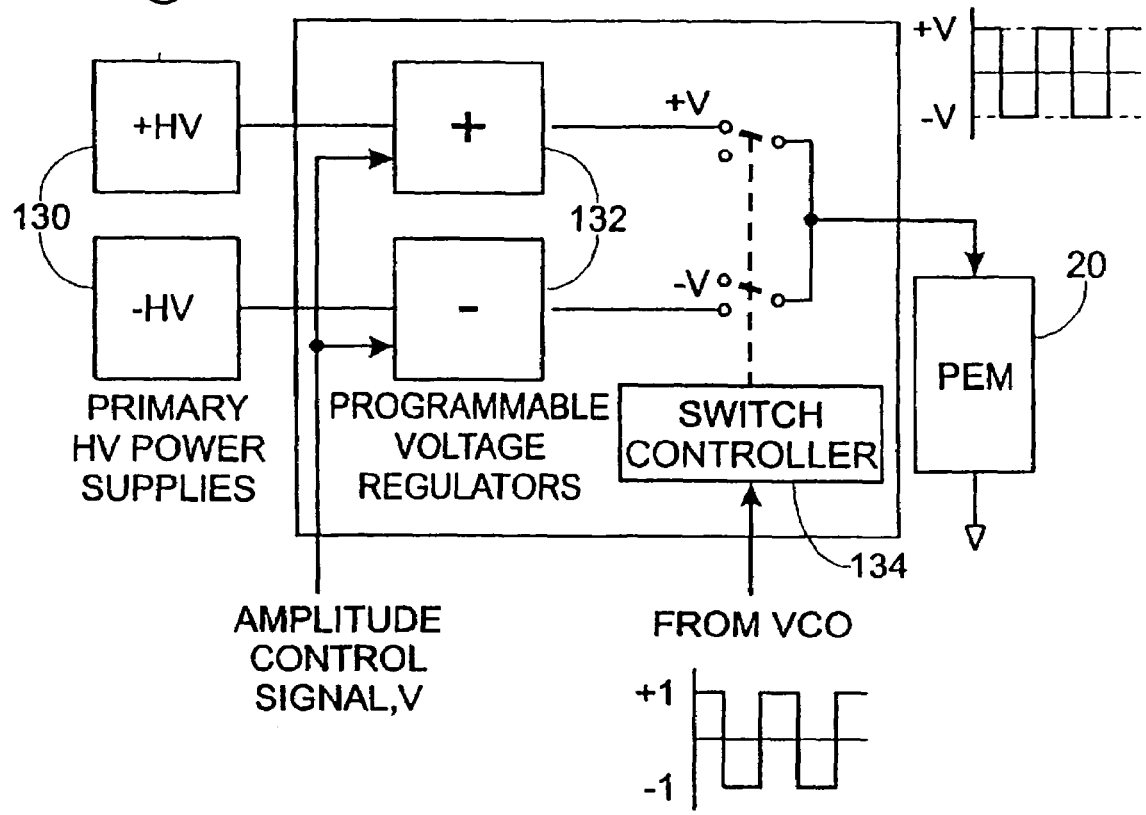
FIG. 5 is a diagram of one preferred embodiment of a circuit for generating a drive voltage waveform for a PEM.

FIG. 5 depicts one preferred embodiment of a waveform generator (primarily represented by components 40 and 110 of the local controller 32) for each PEM. The control voltage V from the integrator 106 is used to control the output of two high-voltage power supplies 130 and associated programmable regulators 132 of opposite polarity. The desired waveform is then obtained via a switch controller 134 that is driven by the output of the VCO to switch the output between the two power supplies. The resulting waveform has the same phase and frequency as the VCO output. The switch is implemented with high-speed, high-voltage, MOSFET transistors, which results in a simple circuit that does not introduce significant additional phase errors.

This preferred implementation uses rectangular driving waveforms. Moreover, as long as the frequency of the rectangular waveform is relatively close to the resonance frequency of the PEMs, the very narrow band pass characteristics of the latter (narrow resonance response) filter out the higher harmonics in the driving waveform. Consequently, there is no significant difference between driving the PEMs (near resonance) with rectangular and sinusoidal signals. Of course, using rectangular driving waveforms allows for simpler control of the amplitude and phase of the driving signal.

It will be appreciated that in the foregoing system the individual PEM driving voltages generated by the global and local controllers in accord with equations 1 and 2 force the individual PEM resonant frequencies to converge to the common driving frequency. At the same time, the feedback system generates a driving frequency that tracks an "average" of the individual PEM resonant frequencies. The net result is that the common driving frequency is always within the spread of resonant frequencies and that this spread tends to collapse toward that common driving frequency. Thus, although the initial individual PEM resonant frequencies may be different from each other, as well as from the driving frequency, all resonant frequencies and the driving frequency soon coalesce at a common value. From that point on, all PEMs in the stack operate in unison and are driven at resonance.

Further, both the driving voltage amplitudes and the common driving frequency also depend on the total amplitude error. This dependence is such that the PEMs, while operating in unison, also track the selected total retardation amplitude. The net result is a PEM stack that operates like a single PEM, but at a much higher retardation amplitude.

If the manufacturing differences between PEMs are so large that a common driving frequency that is an "average" of individual resonant frequencies cannot drive all PEMs efficiently at startup, the common driving frequency generated by the control system can be modified so as to drive most efficiently the PEMs farthest in resonant frequency from the average. This can result in an initial decrease in the spread of resonant frequencies as the system warms up, to the point where the method described above can be successfully applied. Alternatively, it is also possible to drive each PEM at its particular resonant frequency at startup, thus achieving an initial reduction in resonant frequency spread that is sufficient for the preferred control method.

Moreover, if the manufacturing differences between PEMs are large, common resonance driving may result in some PEMs running at considerably higher temperatures than the others. Since the hotter PEMs are the ones being driven harder, they also contribute the most to the total retardation amplitude. In such a situation, driving levels and retardation amplitudes can be balanced by controlling the ambient temperature of the individual PEMs. The temperatures of the hotter PEMs can be maintained at elevated levels by external heating, thus reducing driving amplitudes relative to those of the cooler PEMs. Ambient temperature control can be used for coarse and slow resonant frequency tuning, while the finer and faster adjustments are still made by controlling the driving voltage amplitude.

Figure 6:
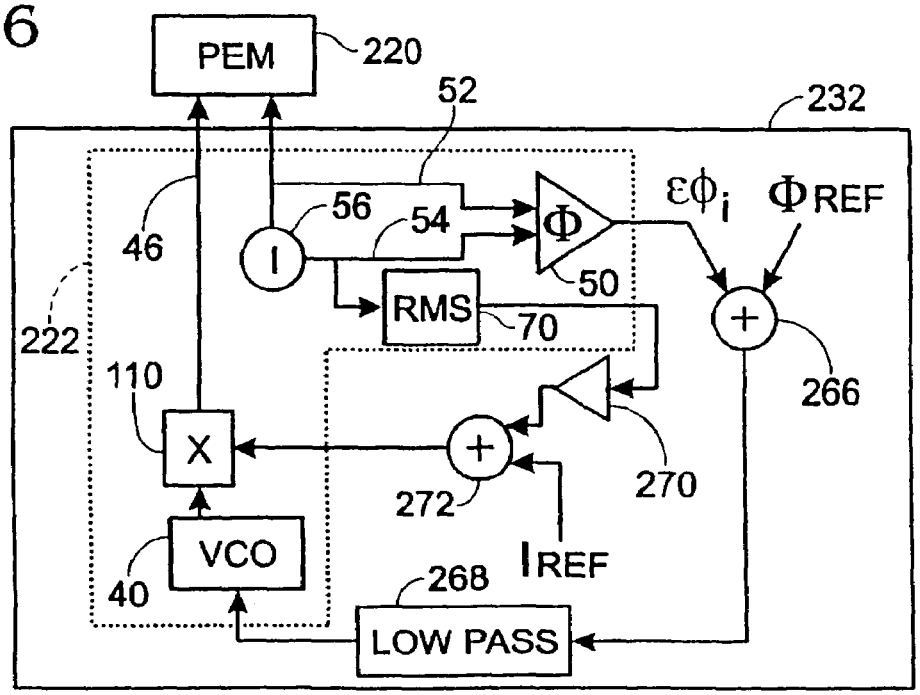
FIG. 6 is a diagram of a system for controlling a single PEM in accordance with another aspect of the present invention.

FIG. 6 illustrates a controller that may be used with a single PEM 220 so that the PEM is controlled in a manner to account for subtle changes in the PEM's resonant frequency, which changes may occur as the current amplitude is increased to increase the retardation amplitude provided by the PEM. The single-PEM controller 232 keeps constant both the retardation amplitude of the PEM and the actual operating frequency of the PEM, which frequency need not necessarily be the resonant frequency.

It is noteworthy that the controller 232 may be a modified version of a local controller 32 as described above, but switchable, as by control of the computer 36, into the independent or single-PEM control mode when desired by the user. As will be explained, in this mode, the computer 36 may also be employed to supply certain reference signals to the controller 232.

In view of the dual-mode embodiment just noted, it can be appreciated that many of the controller components (enclosed by dashed lines 222) can be the same as those used in the local controller embodiment 32 and, as such, carry the same reference numbers in FIG. 6. A detailed description of these components, therefore, is not repeated here.

As noted, the key to simultaneous control of the PEM amplitude and operating frequency is the separate control of the phase and the amplitude of the voltage waveform used to drive the PEM. In one embodiment, the individual PEM 220 is driven by the square waveform generated as described above in connection with FIG. 5. The drive voltage signal on line 52 and the current pickup on line 54 are used as inputs to amplitude and phase feedback loops.

As to phase regulation, a phase-lock loop circuit includes the phase comparator 50, which receives as input the voltage signal on line 52, and the current pickup on line 54. The error signal $\epsilon\phi$ is summed with an external phase reference signal $\phi_{REF}$. The output of that summing circuit 266 is applied as the frequency control input of the VCO after passing through a low-pass filter 268. As a result, the driving voltage and current waveforms are phase locked, but with a phase difference determined by the external phase reference signal $\phi_{REF}$...

It will be appreciated that the external phase reference signal $\phi_{REF}$ can be selected at a level that would account for driving frequency drift that occurs if the PEM's retardation amplitude is increased by an amount sufficient to change its resonant frequency. As noted, this drift is attributable, for example, to the power dissipation into the PEM (with attendant temperature change) when the PEM amplitude is increased.

For a given type of PEM (such as fused silica, calcium fluoride, zinc selenide, etc.) the functional relationship between the drive amplitude and resonant frequency changes may be employed, for example as a look-up table processed by the computer 36 or in a control loop (described below) to automatically establish the value of $\Phi_{REF}$ based upon the PEM's drive amplitude, thereby ensuring that a given operating frequency is maintained-even though the PEM may not be driven at its resonant frequency.

As to current regulation of the individual PEM 220, this is achieved by directing the PEM current signal from the rms 70, after inverting at 270, to an input of a differential amplifier 272. The other input to the amplifier is from a user-selected reference current $I_{REF}$. The output of the amplifier is applied as the amplitude control of the waveform applied to the PEM.

Figure 7:
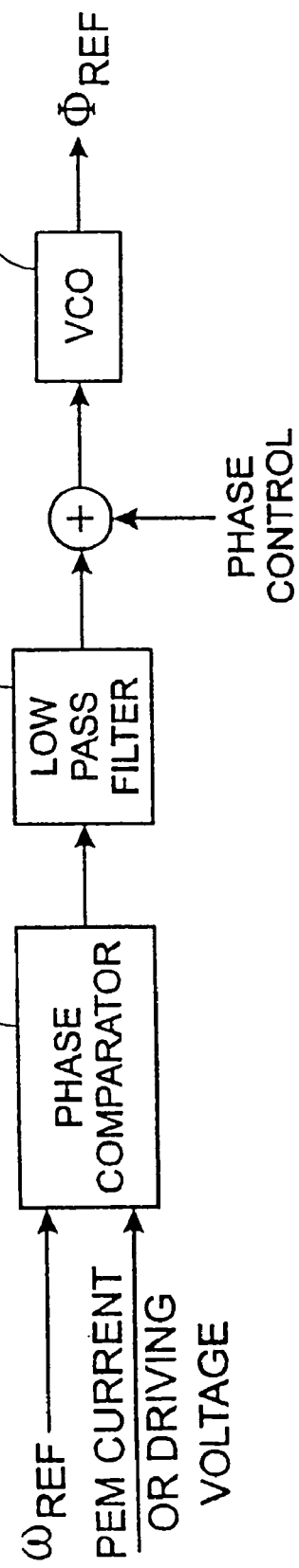
FIG. 7 is a diagram of a system for controlling a single PEM in accordance with another aspect of the present invention.

As to frequency regulation of the individual PEM 220, reference is made to FIG. 7, which defines an outer feedback loop that provides the value of $\Phi_{REF}$ (FIG. 6) for the frequency control of the VCO. FIG. 7 diagrams an analog system that phase-locks the PEM driving voltage or current to a frequency reference signal $\omega_{REF}$. The PEM driving voltage or current are input to a comparator 350 that provides its output, via a low-pass filter, as the control voltage that is applied as the $\Phi_{REF}$ input in the other, inner phase-lock circuit (FIG. 6). As shown in FIG. 7, a "phase control" input can be used to adjust the phase between the PEM current or voltage and the frequency reference signal $\omega_{REF}$.

In lieu of the analog circuit shown in FIG. 7, one could employ a digital outer feedback loop that has a frequency counter for receiving an A/DC-converted PEM driving voltage or current. The output of the frequency counter is compared to a set frequency by a digital processor, which correspondingly adjusts the value of $\Phi_{REF}$. Since the response time of this circuit can be relatively long, a relatively slow processor can be used. Also, the stability, accuracy, and resolution of the frequency counter only depend on how accurately and finely one wants to adjust the PEM's operating frequency.

While the present invention has been described in terms of preferred embodiments, it will be appreciated by one of ordinary skill in the art that modifications may be made without departing from the teachings and spirit of the foregoing. As such, the scope of the invention is defined in the following claims and their equivalents.

What is claimed is:

1. A method of controlling a series of photoelastic modulators wherein each one of the series of "n" photoelastic modulators has a resonant frequency and is operable in response to a drive voltage and to a drive frequency, the method comprising the step of tuning the photoelastic modulators during operation of the photoelastic modulators so that the resonant frequencies of all of the photoelastic modulators converge toward a common resonant frequency.

2. The method of claim 1 wherein the tuning step comprises:
   separately controlling the drive voltage of each photoelastic modulator; and
   providing to each of the photoelastic modulators a common drive frequency.

3. The method of claim 1 wherein each one of the series of photoelastic modulators is controllable to impart a retardation value in electromagnetic radiation that is directed through the photoelastic modulator, the method further comprising the steps of: selecting a reference retardation value;
   separately controlling the drive voltage of each photoelastic modulator;
   providing to each of the photoelastic modulators a common drive frequency; and
   locking the phase of oscillation of the photoelastic modulators to the common drive frequency so that the sum of the retardation values of all of the modulators matches the reference retardation value.

4. The method of claim 3 wherein the step of providing the common drive frequency is accomplished in part by generating an error signal that includes the sum of the amplitudes of current applied to drive the "n" photoelastic modulators.

5. The method of claim 2 wherein the step of separately controlling the drive voltage of each photoelastic modulator includes the step of adjusting the amplitude of the drive waveform in response to a reference signal that substantially reflects an average resonant frequency of the "n" photoelastic modulators.

6. A system for controlling a series of "n" photoelastic modulators wherein each one of the "n" photoelastic modulators has a resonant frequency and is operable in response to a drive voltage and to a drive frequency, comprising:
   "n" local controllers, each one of the local controllers being connected with an associated one of the "n" photoelastic modulators; each local controller including:
      a drive waveform generator responsive to a frequency input signal and to an amplitude input signal for generating a drive signal waveform for driving the photoelastic modulator at a drive voltage and a drive frequency;
      a phase comparator connected to the drive waveform generator and to the photoelastic modulator for producing a phase error signal based upon the phase difference between the current through the photoelastic modulator and the drive voltage signal applied to the photoelastic modulator; and a current pickup circuit connected to the drive waveform generator and for producing a current amplitude signal indicative of the amplitude of the current waveform applied to the photoelastic modulator;

a global controller connected to each of the local controllers in a manner to receive the sum of the phase error signals produced by the phase comparators and the sum of the current amplitude signals produced by the current pickups, wherein the global controller includes:

control circuit means for producing a drive frequency signal for controlling the frequency input signal for all of the "n" drive waveform generators and for producing an amplitude signal for controlling the amplitude input signal for all of the "n" drive waveform generators.

7. A method for controlling a resonant photoelastic modulator, comprising the steps of:

controlling the amplitude of the photoelastic modulator oscillation; and controlling the frequency of the photoelastic modulator oscillation by comparing the phase difference between a reference frequency generated external to the photoelastic modulator and a current waveform that is applied for flowing current through the photoelastic modulator to discern an error signal, and applying the error signal for enabling oscillation of the photoelastic modulator in phase with the reference frequency.

8. The method of claim 7 wherein the step of controlling the frequency of the photoelastic modulator oscillation includes controlling the phase difference between the voltage waveform of a drive signal applied to the photoelastic modulator and the current flowing through the photoelastic modulator.

9. The method of claim 8 wherein the step of controlling the phase difference includes the step of:

phase locking the drive signal voltage waveform to the waveform of the current flowing through the photoelastic modulator.

10. The method of claim 9 wherein the photoelastic modulator has a natural resonant frequency and wherein the phase locking step includes the steps of:

comparing the phase difference of the drive signal voltage waveform and the current waveform to discern an error signal based on the difference;

adjusting the error signal; and applying the adjusted error signal for generating the drive signal, thereby to enable the photoelastic modulator to be oscillate at a frequency other than the natural resonant frequency.

11. The method of claim 7 including the step of controlling the frequency of the photoelastic modulator oscillation separately and independently of the amplitude of the photoelastic modulator oscillation.

12. The method of claim 7 including the step of controlling the amplitude of the photoelastic modulator oscillation with a feedback signal.

13. A controller for a resonant photoelastic modulator, comprising:

a drive waveform generator responsive to a frequency input signal and to an amplitude input signal for generating a drive signal waveform for driving the photoelastic modulator at a drive current amplitude and at a drive frequency;

a phase comparator connected to the drive waveform generator and to the photoelastic modulator for producing a phase error signal based upon the phase difference between the drive signal waveform and a current waveform applied to the photoelastic modulator; and a phase-lock loop circuit for receiving the phase error signal and for generating a frequency input signal based on that error signal, and for applying the frequency input signal to the waveform generator.

14. The controller of claim 13 wherein the photoelastic modulator has a resonant frequency that is variable with the amplitude of the drive signal that is applied to it, the system further comprising:

a reference current amplitude circuit for applying to the drive waveform generator an amplitude input signal having a value representing a selected current amplitude, and for changing the value of the amplitude input signal in response to changes in the selected current amplitude; and tuning means for adjusting the phase error signal received by the phase-lock loop circuit in response to changes in the value of the amplitude input signal, thereby to account for variations in the resonant frequency of the photoelastic modulator.

* * * * *